(12) United States Patent
Benchenaa et al.

(10) Patent No.: US 9,769,106 B2
(45) Date of Patent: Sep. 19, 2017

(54) DISPLAYING NOTIFICATIONS ON A MOBILE COMPUTING DEVICE

(71) Applicant: Intel Corporation, Santa Clara, CA (US)

(72) Inventors: Hayat Benchenaa, London (GB); Daren P. Wilson, London (GB); Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 13/729,373

(22) Filed: Dec. 28, 2012

(65) Prior Publication Data

US 2014/0189030 A1    Jul. 3, 2014

(51) Int. Cl.
*G06F 15/16*    (2006.01)
*H04L 12/58*    (2006.01)

(52) U.S. Cl.
CPC .............. *H04L 51/26* (2013.01); *H04L 51/24* (2013.01); *H04L 51/12* (2013.01)

(58) Field of Classification Search
CPC ......... H04L 51/22; H04L 51/26; H04L 51/24; H04L 1/0631; H04L 12/857; H04L 12/1895
USPC .......................................................... 709/207
See application file for complete search history.

(56) References Cited

U.S. PATENT DOCUMENTS

| | | | |
|---|---|---|---|
| 7,155,729 B1 * | 12/2006 | Andrew et al. ............... | 719/318 |
| 7,913,182 B2 * | 3/2011 | Bear et al. .................... | 715/778 |
| 7,982,598 B2 * | 7/2011 | Bonansea et al. ....... | 340/539.11 |
| 8,160,814 B2 | 4/2012 | Nakamura et al. | |
| 8,994,671 B2 * | 3/2015 | Reeves ................. | G06F 3/1438 345/1.1 |
| 2010/0100845 A1 | 4/2010 | Khan et al. | |
| 2010/0169344 A1 | 7/2010 | Ellis et al. | |

(Continued)

FOREIGN PATENT DOCUMENTS

| | | |
|---|---|---|
| CN | 101208651 A | 6/2008 |
| CN | 102314347 A | 1/2012 |

(Continued)

OTHER PUBLICATIONS wikipedia.org, "Notification system," Wikipedia, The Free Encyclopedia, retrieved from: <http://en.wikipedia.org/w/index.php?title=Notification_system&oldid=460624154>, edited Nov. 14, 2011, 3 pages.

(Continued)

*Primary Examiner* — Liangche A Wang
*Assistant Examiner* — Ayele Woldemariam
(74) *Attorney, Agent, or Firm* — Barnes & Thornburg LLP

(57) ABSTRACT

Technologies for displaying notifications on a mobile computing device includes determining a notification category for each notification, determining a priority level for each notification in each notification category, and determining a priority order of the notification categories. The notification categories are displayed as notification containers in which the associated notifications are displayed. Each notification may be displayed as separate tile having a location, size, color, and/or other visual property based on the relative priority level of the individual notification.

17 Claims, 5 Drawing Sheets

(56) References Cited

U.S. PATENT DOCUMENTS

| | | | |
|---|---|---|---|
| 2012/0112908 A1* | 5/2012 | Prykari | H04L 67/325 340/540 |
| 2012/0149342 A1 | 6/2012 | Cohen et al. | |
| 2012/0323933 A1* | 12/2012 | He et al. | 707/749 |
| 2014/0059144 A1* | 2/2014 | Lehmann et al. | 709/206 |
| 2014/0184519 A1 | 7/2014 | Benchenaa et al. | |
| 2014/0188907 A1 | 7/2014 | Benchenaa et al. | |

FOREIGN PATENT DOCUMENTS

| | | |
|---|---|---|
| KR | 1020110091083 A | 8/2011 |
| WO | 2012/170446 A2 | 12/2012 |

OTHER PUBLICATIONS

International Search Report and Writren Opinion received for International Application No. PCT/US2013/077185, mailed Apr. 25, 2014, 11 pages.

European Search Report for Application No. 13868674.6-1862/2939083, dated Aug. 26, 2016, 8 pages.

Office Action for Chinese Patent Application No. 201380062251.6, dated Nov. 11, 2016, 12 pages.

1Dffice Action for Chinese Patent Application No. 201380062251.6, dated Jun. 27, 2017, 14 pp.

\* cited by examiner

DISPLAYING NOTIFICATIONS ON A MOBILE COMPUTING DEVICE

BACKGROUND

Mobile computing devices are becoming ubiquitous tools for personal, business, and social uses. The portability of mobile computing devices is increasing as the size of the devices decrease and processing power increases. In fact, many computing devices are sized to be hand-held by the user to improve ease of use. Additionally, modern mobile computing devices are equipped with increased processing power and data storage capability to allow such devices to perform advanced processing. Further, many modern mobile computing devices are capable of connecting to various data networks, including the Internet, to retrieve and receive data communications over such networks. As such, modern mobile computing devices are powerful, often personal, tools untethered to a particular location.

Depending on the nature and degree of use of the mobile computing device, a typical user may receive a large number to an extremely large number of notifications each day. Such notifications may be personal or business related. For example, the notifications may include text messages, voice calls, instant messages, status updates from social networking sites, e-mails, Rich Site Summary (RSS) updates, game messages, weather updates, computing device maintenance massages, and other types of notifications. Typically, such notifications are presented to the user in a list format, which may be sorted based on the time of receipt of the notification (e.g., the most recent notifications appear at the top of the list). Although each notification may provide means for interacting with the particular notification or the underlying application, the user's interaction with the notification list on a mobile computing device can be cumbersome due to various factors including the typically limited display space on such devices, the tendency of notification lists to grow over time, and the inability for the user to quickly discriminate between important and unimportant notifications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
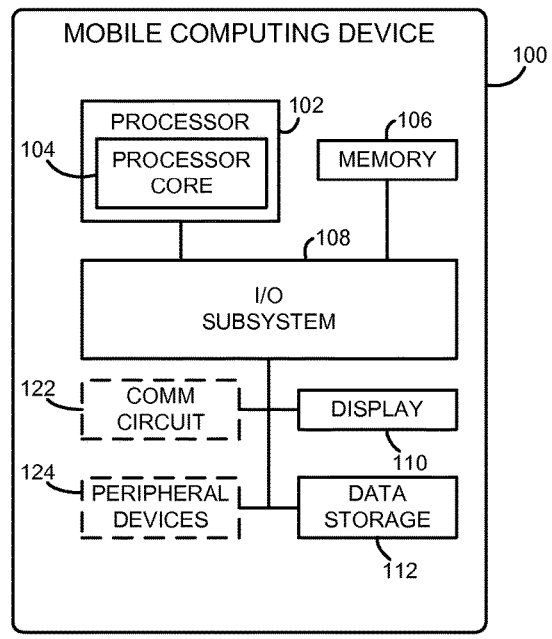
FIG. 1 is a simplified block diagram of at least one embodiment of a mobile computing device for displaying notifications.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a mobile computing device 100 is configured to receive and display notifications on a display 110 of the device 100 based on a priority of the received notifications. The notifications may be embodied as any type of notification that may be received by, or otherwise generated on, the mobile computing device 100. For example, the notifications may include text messages, voice calls, instant messages, status updates from remote sites/servers, e-mails, Rich Site Summary (RSS) updates, game messages/updates, weather updates, computing device maintenance massages, user application notifications, and other types of notifications. As discussed in more detail below, the mobile computing device 100 determines a notification category for each received notification and a priority level for each notification relative to other notifications of the same assigned notification category. The computing device 100 also determines a priority order of the notification categories and displays a notification container corresponding to each notification category in a position on the display 110 based on the determined priority order of the notification categories. The notifications of each notification category are display within the corresponding notification container based on the priority level of each notification. For example, in the illustrative embodiment, each notification is displayed as a notification tile having a size and/or location within the corresponding category container that are determined as a function of the priority level of the respective notification. In this way, a user may view a large volume of notifications on the display 110 at the same time (i.e., without scrolling or panning the view port of the display 110) and quickly discriminate important notifications from less important notifications based on the size and location of each notification tile as discussed in more detail below.

The mobile computing device 100 may be embodied as any type of mobile computing device capable of performing the functions described herein. For example, in some embodiments, the mobile computing device 100 may be embodied as a "smart" phone, a tablet computer, a mobile media device, and a game console, a mobile internet device (MID), a personal digital assistant, a laptop computer, a mobile appliance device, or other mobile computing device. As shown in FIG. 1, the illustrative mobile computing device 100 includes a processor 102, a memory 106, an input/output subsystem 108, and a display 110. Of course, the mobile computing device 100 may include other or additional components, such as those commonly found in a mobile computing device and/or communication device (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. Similarly, the memory 106 may be embodied as any type of volatile or non-volatile memory or data storage currently known or developed in the future and capable of performing the functions described herein. In operation, the memory 106 may store various data and software used during operation of the mobile computing device 100 such as operating systems, applications, programs, libraries, and drivers. The memory 106 is communicatively coupled to the processor 102 via the I/O subsystem 108, which may be embodied as circuitry and/or components to facilitate input/output operations with the processor 102, the memory 106, and other components of the mobile computing device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the mobile computing device 100, on a single integrated circuit chip.

The display 110 of the mobile computing device 100 may be embodied as any type of display on which information may be displayed to a user of the mobile computing device 100. For example, the display 110 may be embodied as, or otherwise use, any suitable display technology including, for example, a liquid crystal display (LCD), a light emitting diode (LED) display, a cathode ray tube (CRT) display, a plasma display, and/or other display usable in a mobile computing device. Additionally, in some embodiments, the display 110 may be embodied as a touchscreen display and include an associated touchscreen sensor (not shown) to receive tactile input and data entry from the user.

The mobile computing device 100 may also include a data storage 112. The data storage 112 may be embodied as any type of device or devices configured for the short-term or long-term storage of data such as, for example, memory devices and circuits, memory cards, hard disk drives, solid-state drives, or other data storage devices. In the illustrative embodiment, the mobile computing device 100 may store the received notifications, along with various policy data, in the data storage 112 as discussed in more detail below in regard to FIG. 2.

In some embodiments, the mobile computing device 100 may also include a communication circuit 122. The communication circuit 122 may be embodied as one or more devices and/or circuitry for enabling communications with one or more remote devices over a network. The communication circuit 122 may be configured to use any suitable communication protocol to communicate with remote devices over such network including, for example, cellular communication protocols, wireless data communication protocols, and/or wired data communication protocols.

Additionally, in some embodiments, the mobile computing device 100 may further include one or more peripheral devices 124. Such peripheral devices 124 may include any type of peripheral device commonly found in a mobile computing device such as speakers, a hardware keyboard, input/output devices, peripheral communication devices, antennas, and/or other peripheral devices.

Figure 2:
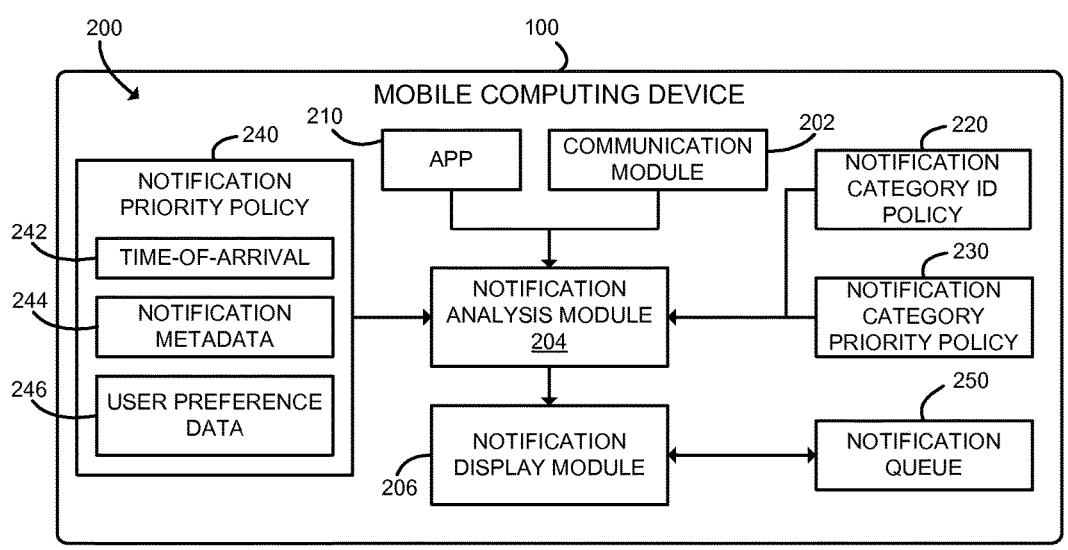
FIG. 2 is a simplified block diagram of at least one embodiment of an environment of the mobile computing device of FIG. 1.

Referring now to FIG. 2, in one embodiment, the mobile computing device 100 establishes an environment 200 during operation. The illustrative environment 200 includes a communication module 202, a notification analysis module 204, and a notification display module 206, each of which may be embodied as software, firmware, hardware, or a combination thereof. During use, new notifications may be received by, or generated on, the mobile computing device 100 and displayed on the display 110 based on a determined priority level associated with each new notification. For example, new notifications generated by remote sources (e.g., a remote social media server, a remote e-mail server, etc.) may be received by the communication module 202, which subsequently provides the notifications to the notification analysis module 204. Additionally, new notifications that are generated locally, such as by an application 210 (e.g., a user application, an operating system, and/or other software/firmware executing on the mobile computing device 100), may be provided to (or intercepted by) the notification analysis module 204.

The notification analysis module 204 is configured to analyze the received notifications to determine an associated notification category to which the received notification is to be assigned. To do so, the notification analysis module 204 may access a notification category identification policy 220, which may be stored in the data storage 112. The notification category identification policy 220 includes a set of rules from which the notification analysis module 204 may identify the notification category of any newly received notification. Such rules may be embodied as any type of rule usable to assign a notification category to the received notification. For example, the notification category identification policy 220 may provide rules for determining the notification category of the new notification based on the type of notification (e.g., whether the notification is a voice call, a text message, an instant message, a social media update, an operating system maintenance message, an application message, etc.) and/or the source of the notification (e.g., whether the notification was received from a social media source, from a local application, from a particular social media source, etc.).

The notification analysis module 204 is also configured to determine a priority order of the notification categories. To do so, the notification analysis module 204 may access a notification category priority policy 230, which may be stored in the data storage 112. Similar to the notification category identification policy 220, the notification category priority policy 230 includes a set of rules from which the notification analysis module 204 may determine the order of priority of each defined notification category. Such rules may be embodied as any type of rule usable to assign a relative priority order amongst the various notification categories. For example, the notification category priority policy 230 may provide rules for determining the order of priority of the notification categories based on the type of notifications assigned to the particular category (e.g., a social media category, a voicemail category, a text messages category), the source of the notifications assigned to the particular category (e.g., a "messages from parents" category, a Facebook® category, a game application category), and/or a predefined order of priority assigned to the particular category. As such, the notification analysis module 204 may determine the priority order of the defined notification categories by comparing each notification category to the notification category priority policy 230.

The notification analysis module 204 is also configured to determine a level of priority of each notification assigned to a notification category relative to other notifications of the same notification category. To do so, the notification analysis module 204 may access a notification priority policy 240, which may also be stored in the data storage 112. The notification priority policy 240 includes a set of rules from which the notification analysis module 204 may determine the relative priority level of each notification of a particular notification category. Such rules may be embodied as any type of rule usable to determine the relative priority level. For example, in some embodiments, the notification priority policy 240 may include time-of-arrival rules 242 for determining the priority level of the notification (e.g., recent notification may be considered to be of a higher priority than older notification). Additionally or alternatively, the notification priority policy 240 may include notification metadata rules 244 for determining the priority level of the notification (e.g., based on the type of notification, the source of the notification, and/or a pre-defined priority level provided in the metadata). For example, in one embodiment, notifications originating from the spouse of the user may be assigned a top, or otherwise, high priority relative to other notifications. Such spouse relationship (and other user relationships) may be predefined by the user or based on relationships define at other locations (e.g., via a Facebook connection, based on the user's contacts marking, the spouse's contacts marking, etc.). Further, the notification priority policy 240 may include user preference data 246 for determining the priority level of the notification. The user preference data 246 may be embodied as inferred rules based on historical user interaction (e.g., whether the user responds quickly to a particular type or source of notifications, the frequency of communications from a particular source, etc.) and/or explicit rules defined by the user. The explicit rules may be embodied as user-specified priority levels of notifications based on any aspect of the notifications (e.g., the type, source, time-of-arrival, content, etc.). In this way, the user may override any determined priority level or otherwise define the desired priority level of particular notifications. As discussed in more detail below, the user preference data 246 may be updated automatically (or manually) based on the historical interaction of the user with the received notifications.

The notification display module 206 is configured to display each of the defined notification categories as corresponding notification containers in a location (e.g., list order) on the display 110 based on the relative priority order of each associated notification category as determined by the notification analysis module 204. Additionally, the notification display module 206 displays each notification assigned to a particular notification category in the corresponding notification container. As discussed in more detail below, in some embodiments, the individual notifications may be displayed in the corresponding notification containers as notification tiles having a size and location within the corresponding notification container based on the relative level of priority of each notification. For example, notifications having a higher level of priority may have a larger sized tile that is displayed toward the top and/or left side of the corresponding notification container. Additionally, other visual characteristics of the notification tile, such as color, animation, text size/style, etc., may be modified to indicate the relative level of priority of each notification. Each notification tile may have any type of geometric shape (e.g., rectangular tile, elliptical tile, circular tile, irregular tile, or other shape). Additionally, each notification container may be embodied as a two-dimensional container in which the relative locations of the notification tiles are determined in two dimensions (e.g., left/right and top/bottom) or as three-dimensional containers in which in which the relative locations of the notification tiles are determined in three dimensions. For example, notifications of a higher priority may be displayed above notifications of a lower priority. For example, the higher priority notifications may be displayed toward the upper left area of the tile and in front of the lower priority notifications, which may be displayed toward the lower right area of the tile.

If a particular notification container includes more notifications than can be displayed within the defined boundary of the notification container, the notification display module 206 may queue those notifications of the corresponding notification category having lower levels of priority in a notification queue 250. As notifications are deleted by the user, or otherwise expire, the notification display module 206 may retrieve additional notifications, in order of priority level, from the notification queue 250 and display the notifications in the corresponding notification container. In this way, the notification containers are continually updated with newly received and previously received notifications based on the relative priority level of such notifications.

Figure 3:
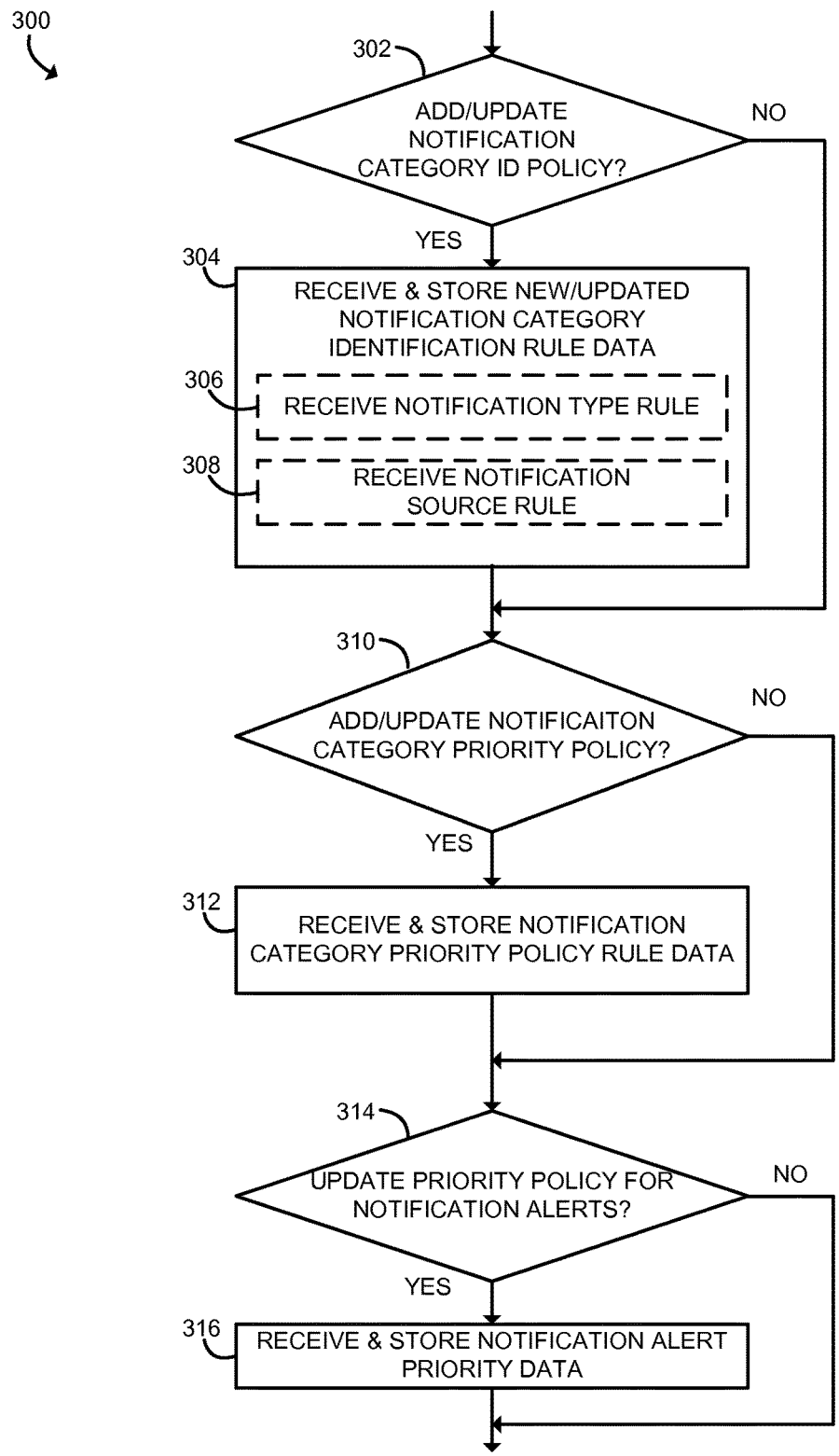
FIG. 3 is a simplified flow diagram of at least one embodiment of a method for managing notification policies that may be executed by the mobile computing device of FIGS. 1 and 2.

Referring now to FIG. 3, in use, the mobile computing device 100 may execute a method 300 for managing notification policies stored on the mobile computing device 100. As discussed above, the mobile computing device 100 may use one or more policies to determine the relative priority of notifications and associated notification categories. The method 300 begins with block 302 in which the mobile computing device 100 determines whether the user desires to add, update, or otherwise define, a notification category identification policy rule. If so, the method 300 advances to block 304 in which the user may enter, or otherwise define, a new or updated notification category identification policy rule. As discussed above, each of the notification category identification policy rules may be embodied as any type of rule usable by the notification analysis module 204 to identify the notification category of a notification. For example, the user may define a new notification type rule in block 306 that defines the notification category of a notification based on the notification type of the notification (e.g., a text message, voicemail, voice call, game message, etc.). Additionally or alternatively, the user may define a new notification source rule in block 308 that defines the notification category of a notification based on the source of the notification (e.g., social media source, local application, etc.). Further, the user may define other notification category identification policy rules based on any aspect of the notification as discussed above. Any such rules received from the user in block 304 are stored in the notification category identification policy 220.

In block 310, the mobile computing device 100 determines whether the user desires to add, update, or otherwise define a notification category priority policy rule. If so, the method 300 advances to block 312 in which the user may enter, or otherwise define, a new or updated notification category priority policy rule. As discussed above, each of the notification category priority policy rules may be embodied as any type of rule usable by the notification analysis module 204 to determine the relative priority order of the notification categories. For example, the user may define the relative order of priority of the notification categories based on the notification type or source of the notifications assigned to each notification category. Additionally or alternatively, the user may explicitly assign an order of priority to one or more notification categories (e.g., those categories the user deems to be important to him/her). Any such rules and/or data received from the user in block 312 are stored in the notification category priority policy 230.

Subsequently, in block 314, the mobile computing device 100 determines whether the user desires to add, update, or otherwise define a notification priority policy rule. If so, the method 300 advances to block 316 in which the user may enter, or otherwise define, a new or updated notification priority policy rule. As discussed above, each notification priority policy rule may be embodied as any type of rule usable by the notification analysis module 204 to determine the relative level of priority of notifications of a particular notification category. For example, the user may define the relative priority level of the notifications based on time-of-arrival, metadata associated with the notification, user preference, and/or other aspects of each notification as discussed above in regard to FIG. 2. Any such rules and/or data received from the user in block 310 are stored in the notification priority policy 240. Although the blocks 302, 310, and 314 have been described above as occurring in a particular order, it should be appreciated that the blocks 302, 310, 314 may be executed in any order or contemporaneously with each other in other embodiments.

Figure 4:
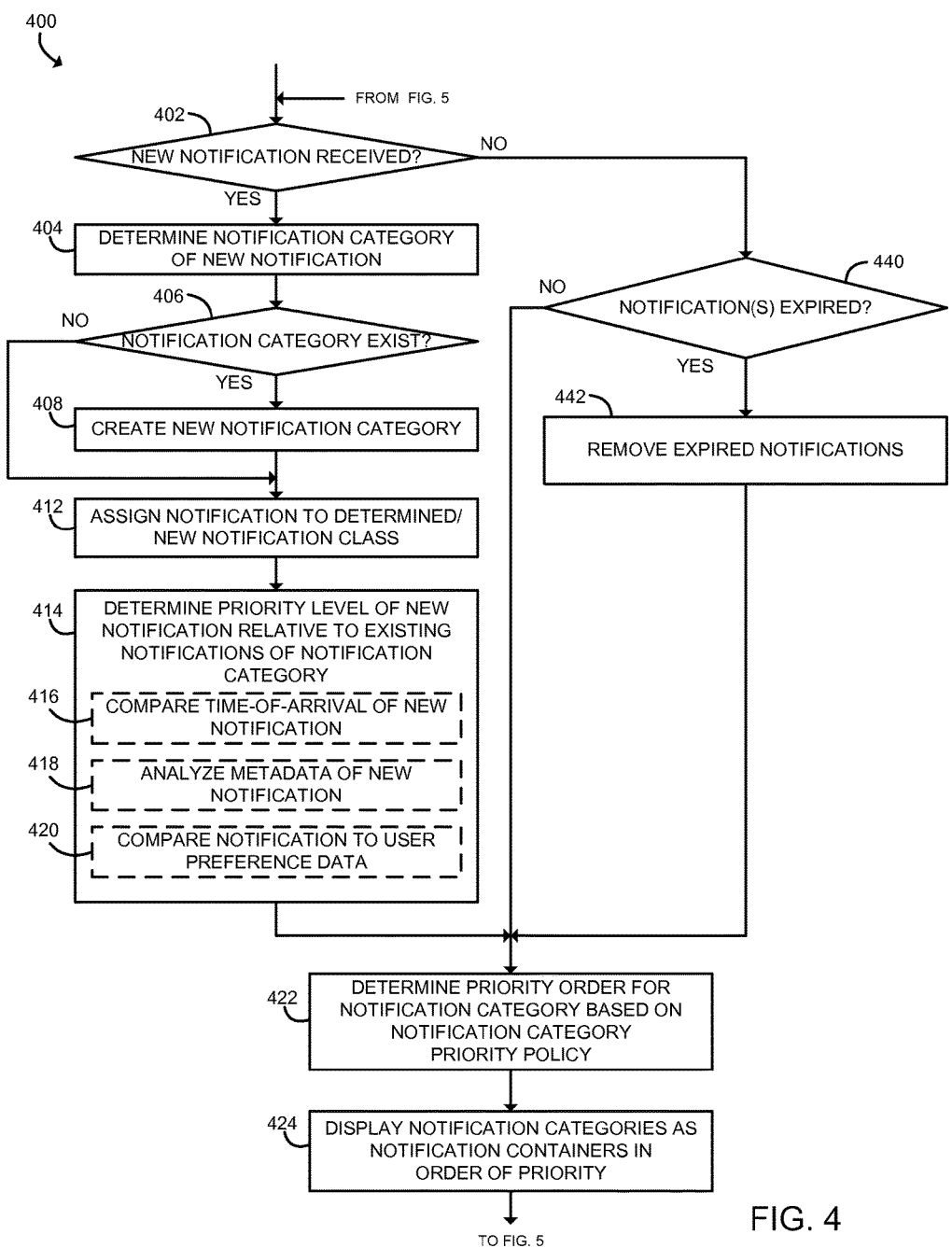
FIGS. 4 and 5 is a simplified flow diagram of at least one embodiment of a method for displaying notifications on the mobile computing device of FIGS. 1 and 2.
Figure 5:
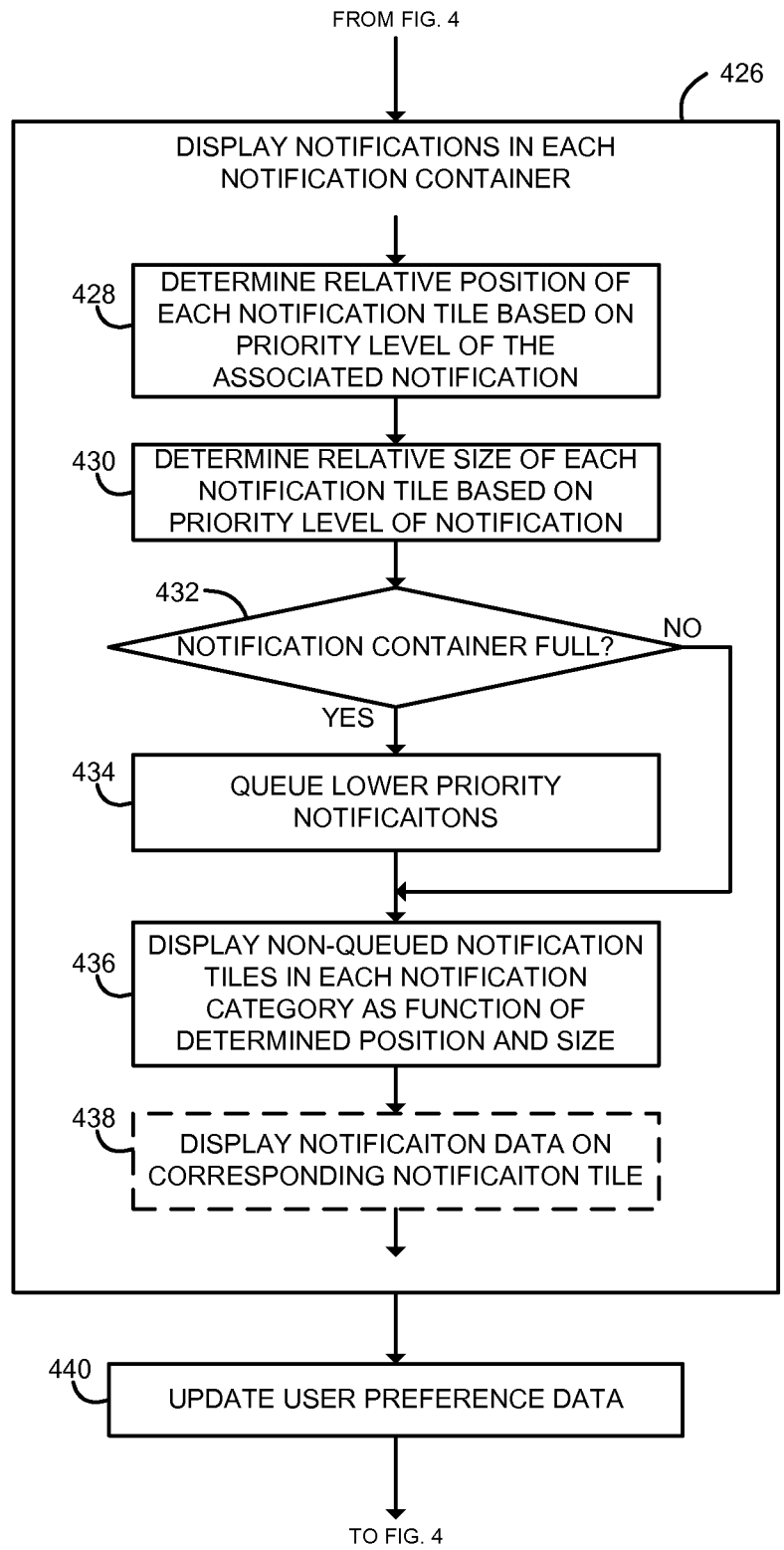

Referring now to FIGS. 4 and 5, in use, the mobile computing device 100 may further execute a method 400 for displaying received notifications on the display 110 of the device 100. The method 400 begins with block 402 in which the mobile computing device 100 determines whether a new notification has been received. As discussed above, notifications may be received from remote sources (e.g., remote servers) via the communication module 202 or may be received locally from an application 210, or other local source, executing on the mobile computing device 100. If a new notification is received in block 402, the method 400 advances to block 404 in which the mobile computing device 100 determines the notification category of the new notification. To do so, as discussed above, the notification analysis module 204 may access the notification category identification policy 220 and compare aspects of the new notification with the rules defined by the notification category identification policy 220 (e.g., the notification type and/or source). Subsequently, in block 406, the mobile computing device 100 determines whether a notification category exists for the newly receive notification. For example, if the notification analysis module 204 is unable to identify a notification category for the new notification based on the notification category identification policy 220, the mobile computing device 100 may infer that no notification category current exists for the new notification. If so, the method 400 advances to block 408 in which a new notification category is created. To do so, the notification analysis module 204 may be configured to infer one or more notification category identification policy rules from aspects of the new notification (e.g., the type or source of the new notification) and store such rules in the notification category identification policy 220. Additionally or alternatively, the notification analysis module 204 may prompt the user to supply notification category identification rule data as discussed above in regard to block 304 of method 300.

After the new notification category has been created, or if the notification category already exists, the method 400 advances to block 412 in which the new notification is assigned to the notification category determined in block 404 or the new notification category created in block 408. Subsequently, in block 414, the mobile computing device determines the priority level of the new notification relative to any existing notifications of the same notification category. To do so, as discussed above, the notification analysis module 204 may access the notification priority policy 240 and compare the new notification with the rules defined by the notification priority policy 240. For example, in block 416, the notification analysis module 204 may compare the time-of-arrival of the new notification to any time-of-arrival policy rules defined in the notification priority policy 240. Additionally or alternatively, the notification analysis module 204 may compare the metadata of the new notification to any metadata policy rules defined in the notification priority policy 240 in block 418. Further, the notification analysis module 204 may compare the new notification, or aspects thereof, to any user preference data 246 defined in the notification priority policy 240 in block 420. It should be appreciated that the priority level of the notification may be determined as a function of multiple policy rules in some embodiments. That is, multiple rules of the notification priority policy 240 may apply to the new notification (e.g., a time-of-arrival rule and a source rule) to determine the final, relative priority level. Additionally, the determination of the relative priority level may be embodied as an iterative or recursive analysis procedure that may take into account the priority levels of other notifications of the same notification category. As such, the notification analysis module 204 may utilize any suitable methodology to determine the relative priority level of the new notification based on the notification priority policy 240.

Subsequently, in block 422, the mobile computing device 100 determines the priority order for each defined notification category (e.g., for each notification category having at least one notification assigned thereto). To do so, as discussed above, the notification analysis module 204 may access the notification category priority policy 230 and compare each notification category to the notification category priority policy rules contained therein to determine the relative priority order of notification categories. After the priority order of the notification categories has been determined in block 422, the mobile computing device 100 displays the notification categories on the display 110 in block 424. To do so, in the illustrative embodiment, the notification display module 206 displays each notification category as a notification container in a relative position on the display 110 as a function of the priority order of each corresponding notification category. For example, in some embodiments, the notification display module 206 may display the notification containers in descending order of priority order of the corresponding notification category.

Figure 6:
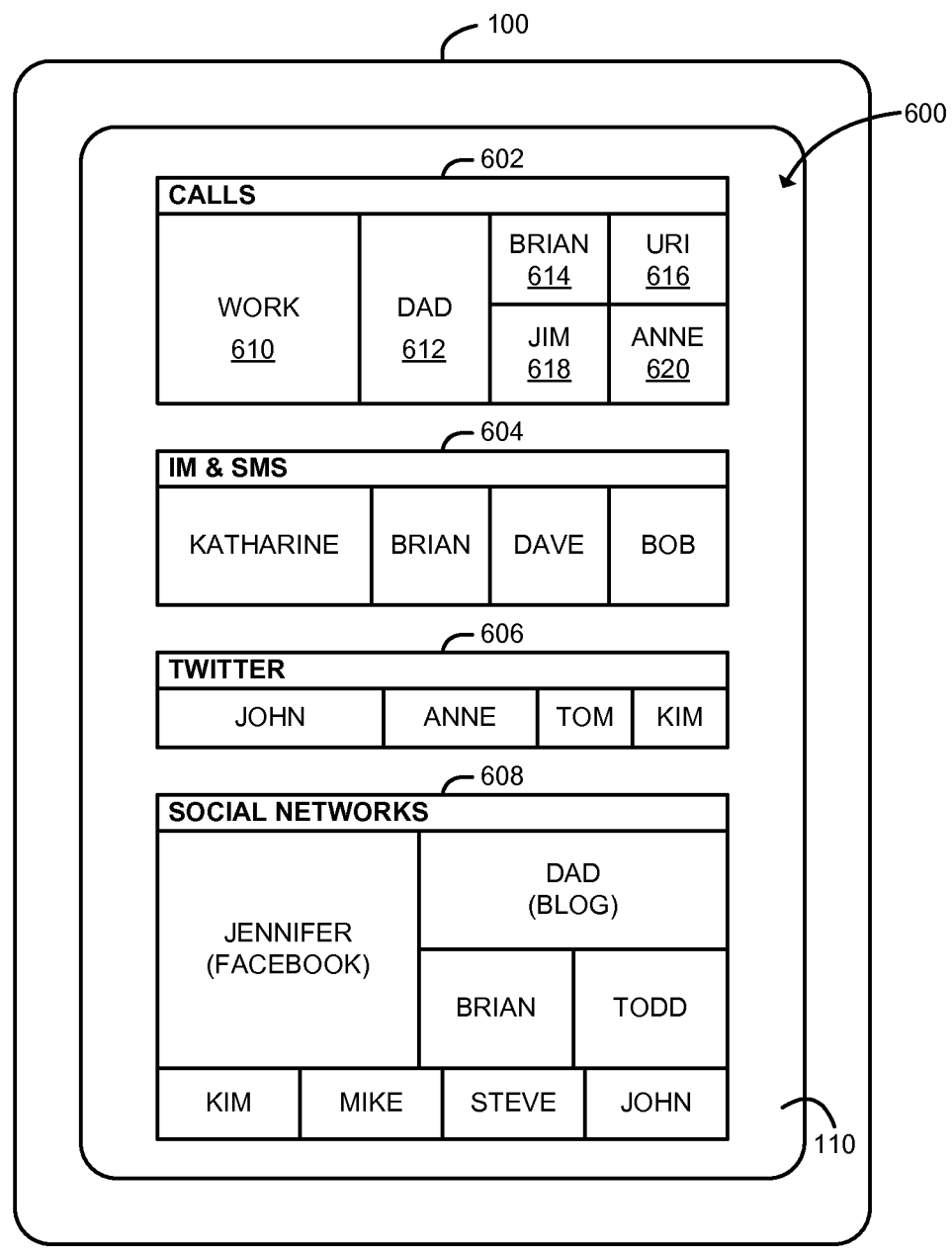
FIG. 6 is a simplified illustration of at least one embodiment of a notification list generated by the method of FIGS. 4 and 5 and displayed on the display of the mobile computing device of FIGS. 1 and 2.

One illustrative embodiment of a notification interface 600 having multiple notification containers displayed on the display 110 of the mobile computing device 100 is shown in FIG. 6. In the illustrative embodiment, the notification display module 206 has displayed four notification containers 602, 604, 606, 608 in descending order of priority order of the corresponding notification category. That is, the "Calls" notification container 602 has determined to have the highest priority, followed by the "IM & SMS" notification container 604, the "Twitter" notification container 606, and the "Social Networks" container 608. The particular size of each notification container 602, 604, 606, 608 may depend on the number of current notifications assigned to the individual container, the priority order of the corresponding notification category, and/or other criteria.

Referring now to FIG. 5, after the mobile computing device 100 displays each notification container on the display 110 in block 424, the method 400 advances to block 426 in which the mobile computing device 100 displays the notifications assigned to each notification category in the corresponding notification container. As discussed above, in some embodiments, the notifications may be displayed in the corresponding notification container as a notification tile. In such embodiments, the notification display module 206 may determine a relative position for each notification tile based on the priority level of the associated notification in block 428. That is, in some embodiments, notification tiles having higher relative priority levels may be displayed in a more prominent position within the corresponding notification container. For example, high priority notification tiles may be displayed toward the top and left side of the corresponding notification container. Similarly, in block 430, the notification display module 206 may determine a relative size for each notification tile based on the priority level of the associated notification. That is, in some embodiments, notification tiles having higher relative priority levels may have a greater size (e.g., surface area) than those notification tiles having a lower priority level.

Subsequently, in block 432, the notification display module 206 determines whether the respective notification container is full. If so, the notification display module 206 queues those notifications having a lower priority level in block 434. The number and identity of the notifications to be queued may be based on a maximum allotted size for the respective notification container, based on the priority level of other notifications of the notification container, on the age of the notifications of the notification container, and/or other criteria.

In block 436, the notification display module 206 displays each non-queued notification tile in each corresponding notification category based on the determined position of the notification tile as determined in block 428 and the determined size of the notification tile as determined in block 426. Additionally, in some embodiments, the notification display module 206 may display notification data on one or more corresponding notification tiles based on, for example, the available space of each notification tile. Such notification data may be embodied as any data associated with the particular notification that may be of use to the user. For example, the notification data may include the type of notification, the source of notification, a name of the notification, the time-of-arrival of the notification, and/or other data associated with the particular notification. For example, as shown in FIG. 6, the "Calls" notification container 602 includes a notification tile 610 indicating a call from "Work" that has been assigned the highest relative priority level based on the size and position of the notification tile 610. That is, the notification tile 610 is the largest notification tile and positioned in the upper-most and left-most location of the corresponding notification container 602. The notification container 602 also includes a notification tile 612 indicative of a call from "Dad" that has been assigned the second highest relative priority level based on the size and position of the notification tile 612. Additionally, the notification container 602 includes notification tiles 614, 616, 618, and 620, each of which have a relatively similar priority level (although notification tile 614 may have the highest priority level amongst the notification tiles 615, 616, 618, and 620). The other notification containers 605, 606, 608 have similar notification tiles having sizes and display positions based on the associated priority level. Additionally, each notification tile has displayed thereon notification data, which illustrative includes the notification name and/or source.

Referring back to FIG. 5, after the notification display module 206 has displayed each notification container, the method 400 advances to block 440. In block 440, the notification analysis module 204 may update the user preference data 226 based on the newly received notification, user interaction with the newly received notification or other notifications, and/or other data related to the notifications and/or notification categories. Such updating may improve the ability of the notification analysis module to properly identify and prioritize new notifications.

After the user preference data 226 has been updated, the method 400 loops back to block 402 in which the mobile computing device 100 determines whether a new notification has been received. If not, the method 400 advances to block 440 in which the notification display module 206 determines whether any displayed or queued notifications have expired. That is, in some embodiments, each notification may be assigned an expiration time after which the notification is considered old. Additionally or alternatively, each notification may have an expiration time associated therewith (e.g., in the metadata associated with the notification). Further, in some embodiments, the notification display module 206 may mark any notification that has been selected and/or reviewed by the user as expired. If no notifications are determined to be expired, the method 400 advances to block 422 in which the priority order of the notification categories is again determined. However, if one or more notifications are deemed to have expired, the notification display module 206 removes (e.g., deletes) the expired notifications. In some embodiments, the notification display module 206 may remove the expired notifications by moving the expired notifications to the notification queue 250. In other embodiments, the notification display module may simply delete the expired notifications. In this way, new and important notifications are maintained on the display 110 for view by the user.

EXAMPLES

Illustrative examples of the devices, systems, and methods disclosed herein are provided below. An embodiment of the devices, systems, and methods may include any one or more, and any combination of, the examples described below.

Example 1 includes a mobile computing device for displaying a plurality of notifications on a display. The mobile computing device comprises a notification analysis module to (i) assign a notification category, from a plurality of notification categories, for each notification of the plurality of notifications, (ii) determine a priority level for each notification relative to each other notification of the same notification category, and (iii) determine a priority order for each notification category of the plurality of notification categories relative to each other; and a notification display module to (i) display each notification category as a separate notification container in a position on the display relative to each other as a function of the priority order of each notification category and (ii) display each notification of each notification category in the corresponding notification container as a function of the priority level of each notification of the same notification category.

Example 2 includes the subject matter of Example 1, and wherein the notification display module is to display a notification tile for each notification in the corresponding notification container, wherein the notification tile has a size and/or a location within the corresponding notification container determined as a function of the priority level of each notification of the same notification category.

Example 3 includes the subject matter of any of Examples 1 and 2, and wherein the notification analysis module is to determine a type of at least one notification and the notification display module is to display the type of the at least one notification on the notification tile associated with the at least one notification.

Example 4 includes the subject matter of any of Examples 1-3, and wherein the notification analysis module is to determine a source of at least one notification and the notification display module is to display the source of the at least one notification on the notification tile associated with the new notification.

Example 5 includes the subject matter of any of Examples 1-4, and wherein the notification display module is to determine whether a notification container is full of notification tiles; and queue at least one notification of the notification category associated with the full notification container as a function of the priority level of the at least one notification.

Example 6 includes the subject matter of any of Examples 1-5, and wherein the notification analysis module is to determine that a notification of a notification category has expired and the notification display module is to remove the notification tile of the expired notification from the corresponding notification container in response to determining that the expired notification has expired.

Example 7 includes the subject matter of any of Examples 1-6, and wherein each notification comprises one of a text message, an e-mail, a voicemail, a voice call, a Rich Site Summary update, a game message, a computing device maintenance message, and a weather update.

Example 8 includes the subject matter of any of Examples 1-7, and wherein the notification analysis module is to determine the notification category of the each notification as a function of at least one of a type of each notification and a source of the each notification.

Example 9 includes the subject matter of any of Examples 1-8, further including a data storage having stored therein a notification category policy defining a set of rules for assigning each notification to one of the plurality of notification categories, and wherein the notification analysis module is to determine the notification category of each notification as a function of a comparison of each notification to the notification category policy.

Example 10 includes the subject matter of any of Examples 1-9, and wherein the notification analysis module is to receive a notification category policy update, and update the notification category policy database with the notification category policy update.

Example 11 includes the subject matter of any of Examples 1-10, and further including a data storage having stored therein a notification priority policy defining a set of rules for determining the priority level of each notification, and wherein the notification analysis module is to determine the priority level of each notification as a function of a comparison of the new notification to the notification priority policy.

Example 12 includes the subject matter of any of Examples 1-11, and wherein the notification analysis module is to receive a notification priority policy update, and update the notification priority policy database with the notification priority policy update.

Example 13 includes the subject matter of any of Examples 1-12, and wherein the notification analysis module is to determine the priority level of at least one notification as a function of a time-of-arrival of the at least one notification.

Example 14 includes the subject matter of any of Examples 1-13, and wherein the notification analysis module is to determine the priority level of at least one notification as a function of metadata associated with the at least one notification.

Example 15 includes the subject matter of any of Examples 1-14, and wherein the notification analysis module is to determine the priority level of at least one notification as a function of a defined priority level of the at least one notification included in the metadata.

Example 16 includes the subject matter of any of Examples 1-15, and wherein the notification analysis module is to determine the priority level of at least one notification as a function of user preference data.

Example 17 includes the subject matter of any of Examples 1-16, and wherein the notification analysis module is to determine a source of the at least one notification, and determine the priority level of the at least one notification as a function of a frequency of communications received from the source of the at least one notification.

Example 18 includes the subject matter of any of Examples 1-17, and wherein the notification analysis module is to determine the priority level of the at least one notification as a function of a defined priority level of the at least one notification included in the user preference data.

Example 19 includes the subject matter of any of Examples 1-18, and wherein the notification analysis module is to update the user preference data as a function of the at least one notification.

Example 20 includes a method for displaying notifications on a mobile computing device. The method includes receiving, on the mobile computing device, a new notification; determining, on the mobile computing device, a notification category of the new notification from a plurality of notification categories; determining, on the mobile computing device, a priority level for the new notification and any existing notifications of the determined notification category relative to each other; determining, on the mobile computing device, a priority order for each of the plurality of notification categories relative to each other; and displaying, on the mobile computing device, each notification category as a separate notification container in a position relative to each other as a function of the priority order of each notification category; and displaying, on the mobile computing device, each notification of each notification category in the corresponding notification container as a function of the priority level of each notification of the same notification category.

Example 21 includes the subject matter of Example 20, and wherein displaying each notification in the corresponding notification container comprises displaying a notification tile for each notification in the corresponding notification container, wherein the notification tile has a size and a location within the corresponding notification container as a function of the priority level of each notification.

Example 22 includes the subject matter of Examples 20 and 21, and further including determining a type of the new notification, and displaying the type of the new notification on the notification tile associated with the new notification.

Example 23 includes the subject matter of Examples 20-22, and further including determining a source of the new notification, and displaying the source of the new notifications on the notification tile associated with the new notifications.

Example 24 includes the subject matter of Examples 20-23, and further including determining whether a notification container in which the new notification is to be displayed is full of notification tiles; and queuing an existing notification of the notification category associated with the full notification container that has a priority level less than the determined priority level of the new notification.

Example 25 includes the subject matter of Examples 20-24, and further including determining that a notification of a notification category has expired; and removing the notification tile of the expired notification from the corresponding notification container.

Example 26 includes the subject matter of Examples 20-25, and wherein receiving a new notification comprises receiving one of a text message, an e-mail, a voicemail, a voice call, a Rich Site Summary update, a game message, a computing device maintenance message, and a weather update.

Example 27 includes the subject matter of Examples 20-26, and wherein determining the notification category of the new notification comprises determining the notification category of the new notification as a function of at least one of the type of new notification and the source of the new notification.

Example 28 includes the subject matter of Examples 20-27, and wherein determining the notification category comprises comparing the new notification to a notification category policy stored on the mobile computing device, the notification category policy defining a set of rules for assigning the new notification to one of the plurality of notification categories.

Example 29 includes the subject matter of Examples 20-28, and further including receiving a notification category policy update, and updating the notification category policy database with the notification category policy update.

Example 30 includes the subject matter of Examples 20-29, and wherein determining the priority level of the new notification comprises comparing the new notification to a notification priority policy stored on the mobile computing device, the notification priority policy defining a set of rules for determining the priority level of the new notification.

Example 31 includes the subject matter of Examples 20-30, and further including receiving a notification priority policy update, and updating the notification priority policy database with the notification priority policy update.

Example 32 includes the subject matter of Examples 20-31, and wherein determining the priority level of the new notification comprises determining the priority level of the new notification as a function of a time-of-arrival of the new notification.

Example 33 includes the subject matter of Examples 20-32, and wherein determining the priority level of the new notification comprises determining the priority level of the new notification as a function of metadata associated with the new notification.

Example 34 includes the subject matter of Examples 20-33, and wherein determining the priority level of the new notification comprises determining the priority level of the new notification as a function of a defined priority level of the new notification included in the metadata.

Example 35 includes the subject matter of Examples 20-34, and wherein determining the priority level of the new notification comprises determining the priority level of the new notification as a function of user preference data.

Example 36 includes the subject matter of Examples 20-35, and wherein determining the priority level of the new notification as a function of the user preference data comprises determining a source of the new notification, and determining the priority level of the new notification as a function of a frequency of communications received from the source of the new notification.

Example 37 includes the subject matter of Examples 20-36, and wherein determining the priority level of the new notification as a function of the user preference data comprises determining the priority level of the new notification as a function of a defined priority level of the new notification included in the user preference data.

Example 38 includes the subject matter of Examples 20-37, and further including updating the user preference data as a function of the new notification.

Example 39 includes a computing device comprising a processor; and a memory having stored therein a plurality of instructions that when executed by the processor cause the computing device to perform the method of any of Examples 20-38.

Example 40 includes one or more machine readable storage media comprising a plurality of instructions stored thereon that in response to being executed result in a computing device performing the method of any of Examples 20-38.

The invention claimed is:

1. A mobile computing device for displaying a plurality of notifications on a display, the mobile computing device comprising:
 a memory having stored therein a notification category policy defining a set of rules for assigning notifications to notification categories;
 a notification analysis module to assign a notification category, from a plurality of notification categories, for each notification of the plurality of notifications as a function of a comparison of each notification to the notification category policy, including to create, in response to a determination that a notification category has not been defined for a received notification and as a function of the notification category policy and a source of the received notification, a new notification category for the received notification, determine a priority level for each notification relative to each other notification of the same notification category based on a source of each notification and as a function of a previously measured time duration between a receipt of a previous notification from the source and a response to the previous notification from a user of the mobile computing device, and determine a priority order for each notification category of the plurality of notification categories relative to each other; and a notification display module to display a first notification category as a first notification container and a second notification category as a second notification container, wherein each notification container is in a different position on the display relative to each other as a function of the priority order of each notification category, and each notification container is to contain a plurality of notifications of the same category, display each notification of each notification category in the corresponding notification container as a notification tile at a location and at a size determined based on the priority level of each notification of the same notification category, determine whether a notification container is full of notification tiles, and queue at least one notification of the notification category associated with the full notification container as a function of the priority level of the at least one notification.

2. The mobile computing device of claim 1, wherein the notification analysis module is to determine that a notification of a notification category has expired; and the notification display module is to remove the notification tile of the expired notification from the corresponding notification container in response to determining that the expired notification has expired.

3. The mobile computing device of claim 1, wherein the notification analysis module is to determine the notification category of each notification as a function of at least one of a type of each notification or a source of each notification.

4. The mobile computing device of claim 1, further comprising a data storage having stored therein a notification priority policy defining a set of rules for determining the priority level of each notification, and wherein the notification analysis module is to determine the priority level of each notification as a function of a comparison of the new notification to the notification priority policy.

5. The mobile computing device of claim 1, wherein the notification analysis module is to further determine the priority level of at least one notification as a function of at least one of: (i) a time-of-arrival of the at least one notification, (ii) metadata associated with the at least one notification, (iii) a defined priority level of the at least one notification included in the metadata, or (iv) a frequency of communications received from a source of the at least one notification.

6. The mobile computing device of claim 1, wherein the notification analysis module is further to determine, from a social network, a personal relationship between the user and the source and determine the priority level for each notification relative to each other notification in the same notification category based additionally on the determined personal relationship.

7. A method for displaying notifications on a mobile computing device, the method comprising:

receiving, on the mobile computing device, a new notification;

determining, on the mobile computing device, a notification category of the new notification from a plurality of notification categories as a function of a comparison of each notification to a notification category policy stored in a memory of the mobile computing device, including creating, in response to a determination that a notification category has not been defined for a received notification and as a function of the notification category policy and a source of the received notification, a new notification category for the received notification;

determining, on the mobile computing device, a priority level for the new notification and any existing notifications of the determined notification category relative to each other based on a source of each notification and as a function of a previously measured time duration between a receipt of a previous notification from the source and a response to the previous notification from a user of the mobile computing device;

displaying, on the mobile computing device, a first notification category as a first notification container and a second notification category as a second notification container, wherein each notification container is in a different position relative to each other as a function of a priority order of each notification category, and each notification container is to contain a plurality of notifications of the same category;

displaying, on the mobile computing device, each notification of each notification category in the corresponding notification container as a notification tile at a location and at a size determined based on the priority level of each notification of the same notification category;

determining, on the mobile computing device, whether a notification container is full of notification tiles; and queueing, on the mobile computing device, at least one notification of the notification category associated with the full notification container as a function of the priority level of the at least one notification.

8. The method of claim 7, wherein:

queuing at least one notification as a function of the priority level of the at least one notification comprises queueing an existing notification of the notification category associated with the full notification container that has a priority level less than the determined priority level of the new notification.

9. The method of claim 7, wherein determining the notification category of the new notification comprises determining the notification category of the new notification as a function of at least one of the type of new notification and the source of the new notification.

10. The method of claim 7, wherein determining the priority level of the new notification comprises comparing the new notification to a notification priority policy stored on the mobile computing device, the notification priority policy defining a set of rules for determining the priority level of the new notification.

11. The method of claim 7, wherein determining the priority level of the new notification further comprises determining the priority level of the new notification as a function of at least one of: (i) a time-of-arrival of the at least one notification, (ii) metadata associated with the at least one notification, (iii) a defined priority level of the at least one notification included in the metadata, (iv) a frequency of communications received from a source of the at least one notification.

12. One or more non-transitory, machine-readable storage media comprising a plurality of instructions stored thereon that in response to being executed result in a mobile computing device:

receiving, on the mobile computing device, a new notification;

determining, on the mobile computing device, a notification category of the new notification from a plurality of notification categories as a function of a comparison of each notification to a notification category policy stored in a memory of the mobile computing device, including creating, in response to a determination that a notification category has not been defined for a received notification and as a function of the notification category policy and a source of the received notification, a new notification category for the received notification;

determining, on the mobile computing device, a priority level for the new notification and any existing notifications of the determined notification category relative to each other based on a source of each notification and as a function of a previously measured time duration between a receipt of a previous notification from the source and a response to the previous notification from a user of the mobile computing device;

displaying, on the mobile computing device, a first notification category as a first notification container and a second notification category as a second notification container, wherein each notification container is in a different position relative to each other as a function of a priority order of each notification category, and each notification container is to contain a plurality of notifications of the same category;

displaying, on the mobile computing device, each notification of each notification category in the corresponding notification container as a notification tile at a location and at a size determined based on the priority level of each notification of the same notification category;

determining, on the mobile computing device, whether a notification container is full of notification tiles; and queueing, on the mobile computing device, at least one notification of the notification category associated with the full notification container as a function of the priority level of the at least one notification.

13. The non-transitory, machine-readable storage media of claim 12, wherein the plurality of instructions, in response to being executed, further result in the mobile computing device determining that a notification of a notification category has expired and removing the notification tile of the expired notification from the corresponding notification container in response to determining that the expired notification has expired.

14. The non-transitory, machine-readable storage media of claim 12, wherein determining the notification category of the new notification comprises determining the notification category of the new notification as a function of at least one of the type of new notification or the source of the new notification.

15. The non-transitory, machine-readable storage media of claim 12, wherein determining the priority level of the new notification comprises comparing the new notification to a notification priority policy stored on the mobile computing device, the notification priority policy defining a set of rules for determining the priority level of the new notification.

16. The non-transitory, machine-readable storage media of claim 12, wherein determining the priority level of the new notification comprises determining the priority level of the new notification as a function of at least one of: (i) a time-of-arrival of the at least one notification, (ii) metadata associated with the at least one notification, (iii) a defined priority level of the at least one notification included in the metadata, or (iv) a frequency of communications received from a source of the at least one notification.

17. The non-transitory, machine-readable storage media of claim 12, wherein the plurality of instructions, in response to being executed, further result in the mobile computing device:

determining a type of the new notification, and displaying the type of the new notification on the notification tile associated with the new notification.

* * * * *